United States Patent [19]
Kieper

[11] Patent Number: 5,427,135
[45] Date of Patent: Jun. 27, 1995

[54] VALVE LOCK

[75] Inventor: Douglas A. Kieper, Finchville, Ky.

[73] Assignee: Nibco, Inc., Elkart, Ind.

[21] Appl. No.: 157,565

[22] Filed: Nov. 24, 1993

Related U.S. Application Data

[62] Division of Ser. No. 934,789, Aug. 24, 1992, Pat. No. 5,360,036.

[51] Int. Cl.[6] .............................................. F16K 35/00
[52] U.S. Cl. ...................................... 137/385; 251/90
[58] Field of Search .................. 251/90; 137/383, 385; 70/177, 180

[56] References Cited

U.S. PATENT DOCUMENTS

| | | | |
|---|---|---|---|
| 666,777 | 1/1901 | Pattman et al. | 251/90 |
| 943,554 | 5/1909 | Kendrick . | |
| 1,067,549 | 7/1913 | Quigley | 137/385 |
| 1,473,774 | 11/1923 | Leech, Jr. | 251/90 |
| 1,615,181 | 1/1927 | Swacker . | |
| 1,689,236 | 10/1928 | Fraser, Jr. . | |
| 1,709,594 | 4/1929 | Rosenberg | 251/90 |
| 2,693,815 | 11/1954 | Gould . | |
| 3,037,526 | 4/1960 | Wheeler . | |
| 3,182,952 | 5/1965 | Montesi . | |
| 3,464,449 | 4/1968 | Morton . | |
| 3,532,111 | 10/1970 | Hansen . | |
| 3,770,061 | 11/1973 | Johnstone et al. . | |
| 4,023,773 | 5/1977 | Wise . | |
| 4,099,543 | 7/1978 | Mong et al. . | |
| 4,125,128 | 11/1978 | Elward et al. . | |
| 4,141,538 | 2/1979 | Bake et al. . | |
| 4,548,237 | 10/1985 | Bogenschutz . | |
| 4,681,134 | 7/1987 | Paris, Sr. | 137/385 |
| 4,681,134 | 11/1990 | Paris, Sr. . | |
| 4,971,289 | 11/1990 | Pietras . | |
| 5,003,797 | 4/1991 | Wirth et al. | 137/385 |
| 5,143,114 | 9/1992 | Daniels | 137/385 |

FOREIGN PATENT DOCUMENTS

| | | | |
|---|---|---|---|
| 208380 | 12/1982 | Japan | 137/383 |
| 234367 | of 0000 | United Kingdom | 251/90 |

OTHER PUBLICATIONS

Nasa Tech Briefs, p. 63, "Burley and Guirquis Space Flight Center", Huntsville, Al, 1991; Marshall Brady Ball Valve Lockout Devide No. 65666, "I".
Brady Ball Valve Lockout Device No. 65666, "II"; B–SafeBall Valve Lockout; W. H. Brasy Co., Milwaukee, WI, 1990.

*Primary Examiner*—A. Michael Chambers
*Attorney, Agent, or Firm*—Middleton & Reutlinger; David W. Carrithers

[57] ABSTRACT

The present invention relates to a vented ball valve and lockout ring assembly.

A vented valve assembly including a valve body having a vent hole therein, and first and second flow-through ends with a valve member receiving chamber thereinbetween, and a stem receiving passage communicating with the chamber. A valve member is disposed within the chamber. The valve member has a throughbore therein in operable alignment with the first end second flow-through ends and at least one valve member vent hole through the wall of the valve member in flow communication with the throughbore. A stem extends through and is rotatably mounted within the stem receiving passage and engageable with the valve member for rotating the valve member in and out of flow-through alignment. A venting means in cooperation with said stem provides selected flow communication with the atmosphere through the valve body vent hole, between the stem and stem receiving passage, through the chamber, and through said valve body vent hole to the flow-through ends.

A removable, generally "d" shaped lock-out ring having a circular main body with a projection having a hole therein extending outward therefrom is rotatably and coaxially mounted around a valve body and positioned between the stem and union nut and alignable with a hole formed in the handle when the valve is in the closed position, whereby a locking member of a padlock can be inserted through the hole in the locking ring and the hole in the handle to prevent rotation of the handle and opening of the valve.

6 Claims, 9 Drawing Sheets

VALVE LOCK

This is a divisional application of Ser. No. 07/934,789, filed on Aug. 24, 1992, now U.S. Pat. No. 5,360,036 issued Nov. 1, 1994.

BACKGROUND OF THE INVENTION

1. Field of the Invention

The present invention relates to a novel valve stem and valve member arrangement to provide a method of venting a plastic ball valve, and provides a lockout ring which can be used with the ball valve of the present invention as well as with other types of valves.

The vented valve assembly of the present invention includes a valve body having a vent hole therein, and first and second flow-through ends with a valve member receiving chamber thereinbetween, and a stem receiving passage communicating with the chamber. A valve member is disposed within the chamber. The valve member has a throughbore therein in operable alignment with the first end second flow-through ends and at least one valve member vent hole through the wall of the valve member in flow communication with the throughbore. A stem extends through and is rotatably mounted within the stem receiving passage and engageable with the valve member for rotating the valve member in and out of flow-through alignment. A venting means in cooperation with said stem provides selected flow communication with the atmosphere through the valve body vent hole, between the stem and stem receiving passage, through the chamber, and through said valve body vent hole to the flow-through ends.

2. Description of the Prior Art

Typical ball valves utilize a ball as the sealing element which is in alignment with the axis of the stem and free to move axially. Pressure differential across the valve forces the ball in the closed position against the downstream seat and the seat against the body. In fixed ball valves, the ball rotates on stem extensions, with the bearings sealed with O-rings. Plastic seats may be compressed or spring-loaded against the ball and the body by the assembly of the valves, or they may be forced against the ball by pressure across the valve acting against O-rings which seal between the seat and the body.

The Clean Air Act of 1990 limits toxic air pollutants grouped under Title III, and OSHA regulations set forth in 40 CFR 1910 of 1992 lists chemicals that can effect the environment, and/or cause worker's personal injury if they leak or are mishandled. Because of their nature and volume in the process industries, especially in severe service, valves are a major target for controlling emissions. In addition, 40 CFR 1910 calls for various valve lock and interlock systems.

Compliance with these recent OSHA regulations require that during maintenance on a fluid "air" transfer system, the valve must seal the line, vent gases downstream, and be locked out. Assemblies have been devised to successfully accomplish this task using metal ball valves by using a split-body type of ball valve. The ball can be shaped to allow air from the downstream flow to seep between the ball and seat and out of a vent hole in the valve body when the valve is in the closed position. When the valve is in the open position the ball surface effectively closes the valve body vent hole. However, this split body arrangement is limited to use for venting metal ball valves, for the seat must be compressed very tightly between the ball and housing on the upstream side of the valve to prevent leakage. A metal ball in combination with a metal housing and/or metal seat can be used; however, valves having the components made of plastic are susceptible to deformation of the plastic upon tightening the ball against the seat or housing. This limitation limits the use and effectiveness of vented plastic ball valves constructed in the same manner as vented metal ball valves.

The venting means described herein can be used for venting most any type of metal or plastic ball or plug type valve. The plastic ball valve described herein has a dropout type of valve body so that the valve may be removed from a piping system for repair or replacement and provides a good seal using a minimum number of molded parts made of plastic materials, such as polyvinyl chloride and the like.

The vented ball valve of the present invention also utilizes a novel lock-out ring device as a safety device. Various lock-out devices are known in the art. These prior art devices generally are comprised of several parts, mechanically linked together. For instance, one type of lock-out device requires that the lock-out must be slipped onto the valve handle, aligned with respect to the handle and pipe, then squeezed together so that the shackle of a padlock can be insert therethrough. Another type of lock-out device known in the art requires that a pronged device completely encapsulate the valve body and handle, adjusted, aligned, and shackled thereon. Still other lock-out devices consist of a hinged donut type of device which completely enclosed the valve. However, these devices are not particularly suitable for use with the vented ball valve of the present invention, for none of the lock-out devices permit high visibility of valve handle and body, and a low profile which does not interfere with the vented stream.

The lock-out rings of the present invention are comprised of a simple one piece design, which are easy to install and inexpensive to manufacture. The "d-shaped" ring is placed coaxially around a pipe and the "leg" member having a hole therein projects outward from the ring body to facilitate alignment with a hole in the handle of the ball valve which accommodates the shackle of a padlock.

SUMMARY OF THE INVENTION

The vented valve assembly of present invention includes a valve body having a vent hole therein, and first and second flow-through ends with a valve member receiving chamber thereinbetween, and a stem receiving passage communicating with the chamber. A valve member is disposed within the chamber. The valve member has a throughbore therein in operable alignment with the first end second flow-through ends and at least one valve member vent hole through the wall of the valve member in flow communication with the throughbore. A stem extends through and is rotatably mounted within the stem receiving passage and engageable with the valve member for rotating the valve member in and out of flow-through alignment. A venting means in cooperation with said stem provides selected flow communication with the atmosphere through the valve body vent hole, between the stem and stem receiving passage, through the chamber, and through said valve body vent hole to the flow-through ends.

The atmospheric venting means includes a generally axial groove including at least one offset arched portion around about a portion of its circumference. The axial groove and offset have an annular sealing member disposed therein forming a seal between the stem and stem receiving passage. The offset arched portion and annular sealing member therein are rotatably aligned so that rotation of the stem rotates the valve member out of operable alignment with the first and second flow-through ends, and positions the offset arched portion and annular sealing member therein in sealing engagement with the stem receiving passage above the valve body vent hole. Venting flow communication is provided from the valve flow-through end, through the valve member vent hole, between the stem and the stem receiving passage, and through the valve body vent hole to the atmosphere. Rotation of the valve member to the selected flow-through alignment by rotation of the stem positions the offset arched portion and annular sealing member therein in sealing engagement with the stem receiving passage below the valve body vent hole sealing the stem receiving passage from the atmosphere.

More particularly, the ball valve of the present invention includes a pair of end connectors detachably held respectively against a tubular valve body having a valve member receiving chamber between the first and second flow-through ends providing a flow passage therethrough, and a stem receiving passage or bonnet extending upward from and communicating with the valve member receiving chamber. A seal carrier retaining a seal member is slidably mounted in at least one end of the valve body seating a rotatable valve ball actuated by a handle detachably engaging a valve stem exteriorly of the body. The valve stem has a generally axial groove including an offset arched portion around a portion of the circumference and an annular sealing member such as an O-ring seated within the axial groove and offset. The stem is rotatably secured within a bore or stem receiving passage extending through the valve bonnet which is an integral part of the valve body. The valve ball is positioned within the valve member receiving chamber and held in contact with an annular seal carried by the carrier and the valve body. The carrier and annular seal thereon are held in limited radial centering movement by a retainer ring detachably engaging the valve body sealing ring and providing for a tightening adjustment of the parts of the assembly when wear occurs upon the seals. A pair of threaded union nuts serve to join the connectors detachably to the valve body by threadably engaging with external threads on the ends of the valve body. A detachable handle engages the distal end of the valve stem and serves to rotate the ball valve in operable alignment between its open flow permitting and closed flow blocking positions.

The ball valve includes a dovetail slot into which a correspondingly shaped key on the lower end of the valve stem is detachably engaged having a stem mounted within a stem receiving passage or bore extending laterally from the portion of the valve body forming a collar or bonnet. The valve ball includes a vent hole in selectable fluid communication with a sealable passage between the stem and the stem receiving passage and a vent hole in the valve body.

In the valve open position, the main flow passage of the valve ball is aligned with the passage in the valve body, and the ball vent hole is sealed against the side wall of the valve body and between the annular seals seating the valve ball. The annular sealing member or O-ring seated within the axial groove around the circumference of the stem is biased against the stem receivng passage and forms an air and water tight seal between the stem and the stem receiving passage of the valve body below the vent hole in the valve bonnet to prevent the escape of vapor or fluid from the valve body during use. Rotation of the handle to the valve closed position, rotates the stem and valve ball so that the ball vent hole is open to vent the downstream fluid flow through the ball vent hole in the valve ball to the throughbore and into the chamber upward between the annular seals seating the ball and the valve body, and between the lower portion of the stem and the stem receiving passage of the bonnet. The O-ring provides a seal between the top portion of the stem attached to the handle and the lower portion of the stem providing a passage for the venting of vapor of fluid to the atmosphere or appropriate container through the vent hole in the valve bonnet positioned below the offset portion of the O-ring.

The ball valve assembly includes a removable, generally "d" shaped lock-out ring having a circular main body with a projection having a hole therein extending therefrom, being rotatably and coaxially mounted around the valve body positioned between the stem and union nut, alignable with a hole formed in the handle when the valve is in the closed position, whereby a locking member of a padlock can be inserted through the hole in the locking ring and the hole in the handle to prevent rotation of the handle and opening of the valve.

It is an object of the present invention to provide a venting means for a plastic ball or plug valve to enable the user to rotate the handle one quarter turn to close the valve and to vent vapor or liquid from the downstream flow through the valve ball, stem, and valve body bonnet vent hole.

It is a further object of the present invention to provide a inexpensive sealing and venting control mechanism employing an annular sealing member within an axial groove within the body of the stem, whereby the groove has at least one offset, upward extending arch on one side for providing a seal either below or above the valve body bonnet vent hole depending upon the rotation of the stem by the handle.

It is an object of the present invention to provide a reliable lock-out means for a sealed ball valve assembly which can be installed with the ball valve and readily inserted in or removed from a piping system without the employment of special tools.

It is another object of the present invention to provide for a one piece lock-out ring of unitary construction.

Moreover it is an object of the invention to provide a lock-out ring having a thin profile which can be inserted between the valve body bonnet and flange of a ball valve.

Furthermore, it is an object of the present invention to provide for a lock-out ring rotatable and coaxial with a pipe or tubular portion of the valve body.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENT

Figure 1:
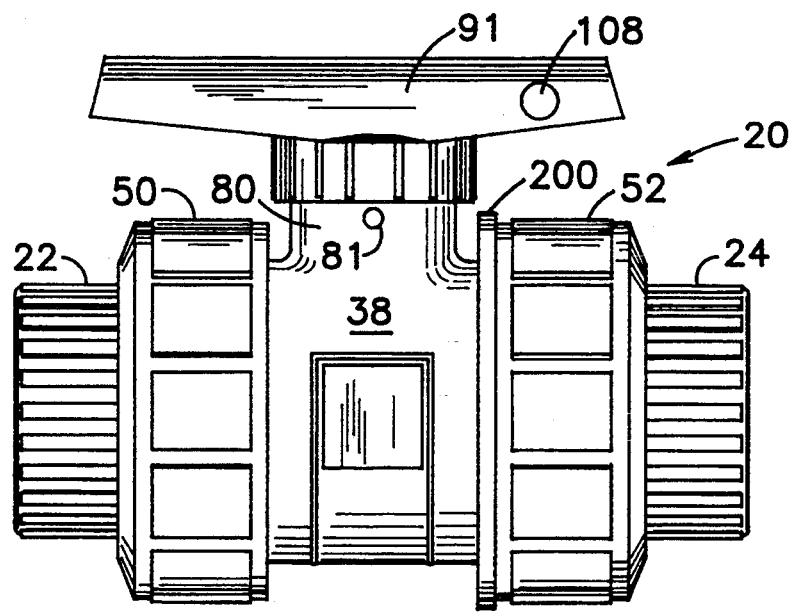
FIG. 1 is a side view of the present invention showing the vented ball valve and lock-out ring.
Figure 2:
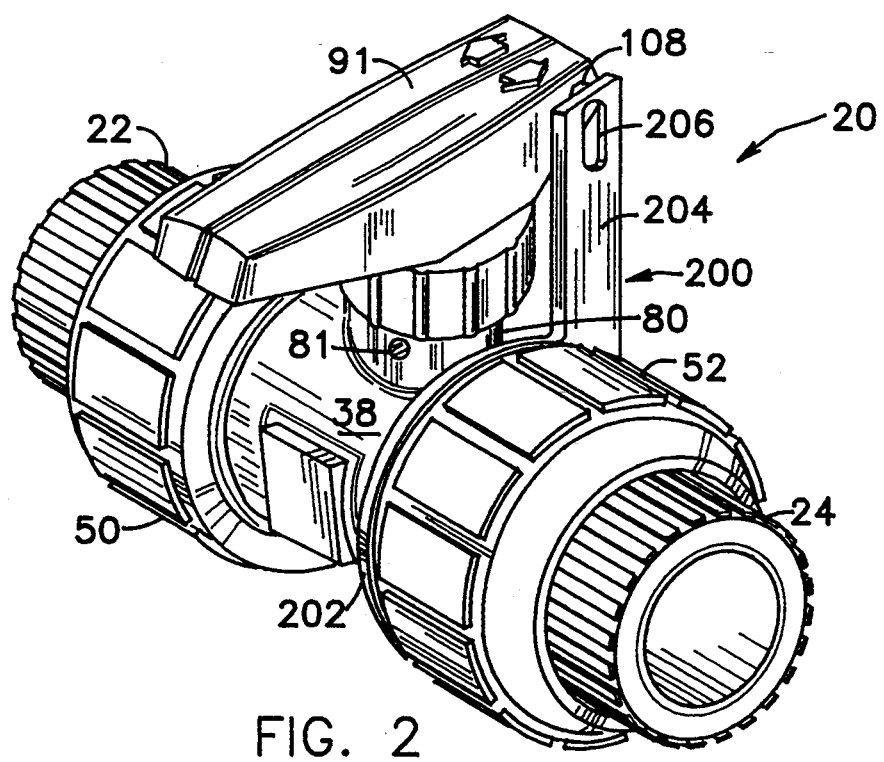
FIG. 2 is a perspective view of the vented ball valve and lock-out ring of FIG. 1.
Figure 3:
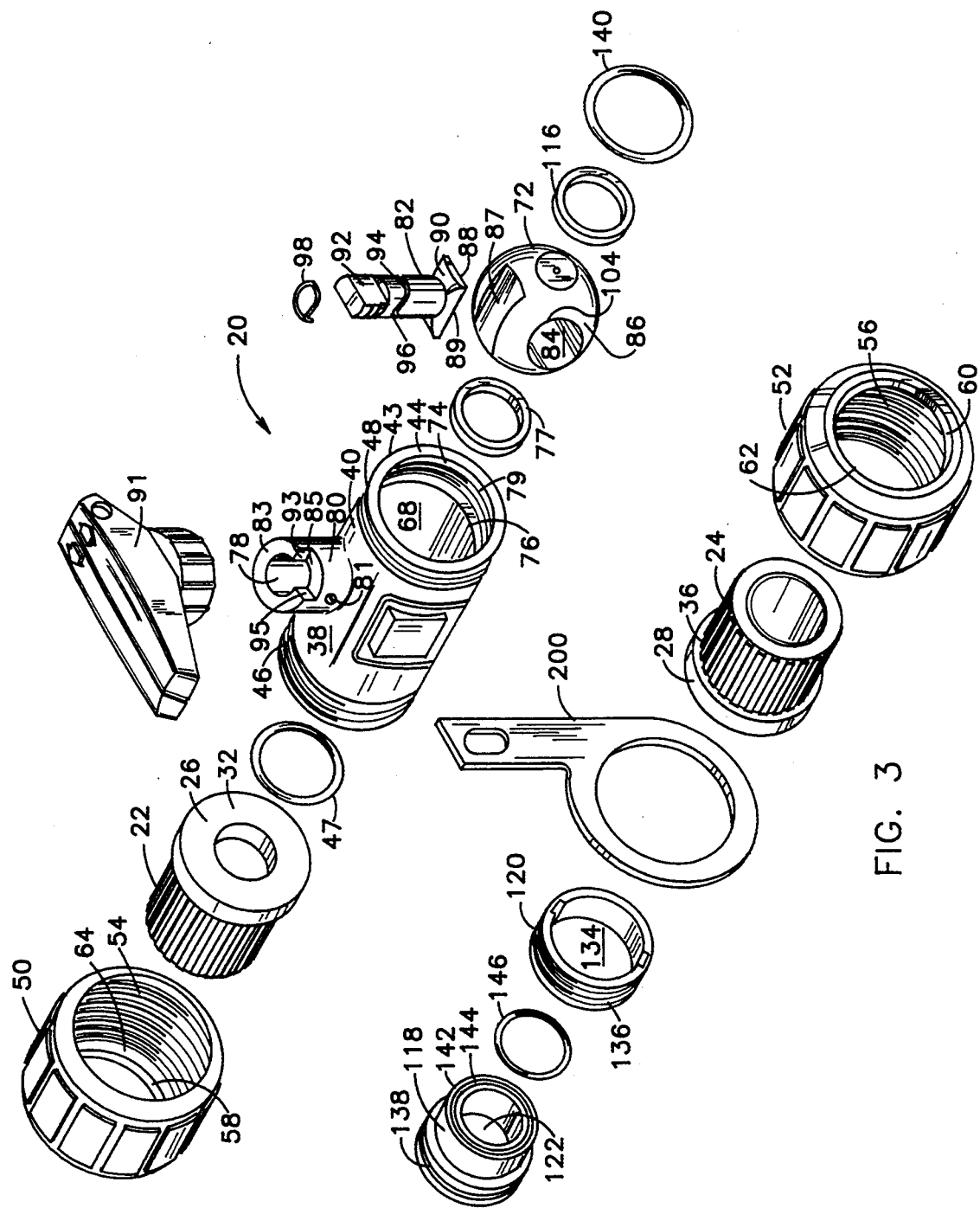
FIG. 3 is an exploded perspective view of the vented ball valve and lock-out ring of FIG. 1.
Figure 4:
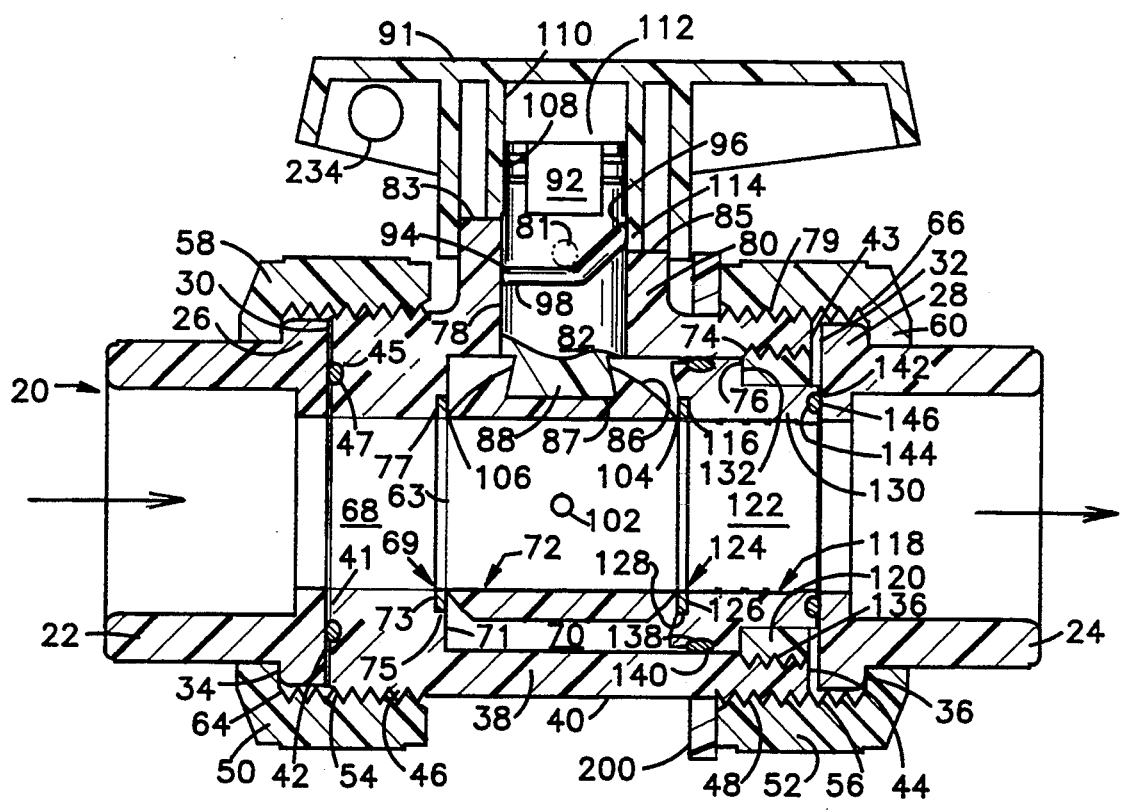
FIG. 4 is a longitudinal sectional view of the vented ball valve and lock-out ring assembly of FIG. 1 showing the ball in the fully open flow position wherein the flow is from left to right and showing a cut-away view of the stem assembly.

The present invention describes a means of venting a plastic ball valve. More particularly, a thermoplastic ball valve of the end entry type such as is described in U.S. Pat. Nos. 3,550,902, 4,099,705, 4,257,575, and 4,449,694) hereby incorporated by reference. Depicted in FIGS. 1 and 2 is an end entry vented ball valve assembly 20 having a lock-out ring 200 constructed in accordance with a preferred embodiment of the present invention. As illustrated in FIGS. 3 and 4, the vented ball valve assembly 20 is adapted for connection in general longitudinal alignment with a pair of fluid conduits (not shown), such as pipes, by means of conventional end connectors 22 and 24. The end connectors 22, 24 have axial flow passages and provide sockets adapted to engage the fluid conduits as shown; however, it is contemplated that the end connectors 22, 24 may be interiorly threaded to serve as means for attaching pipes. The end connectors 22, 24 are provided with generally radially outwardly extending flanges 26 and 28, respectively. Each flange 26, 28 has a substantially radial face 30, 32 and a frustoconical surface 34, 36 which tapers radially inwardly and away from the radial face 30, 32.

Figure 5:
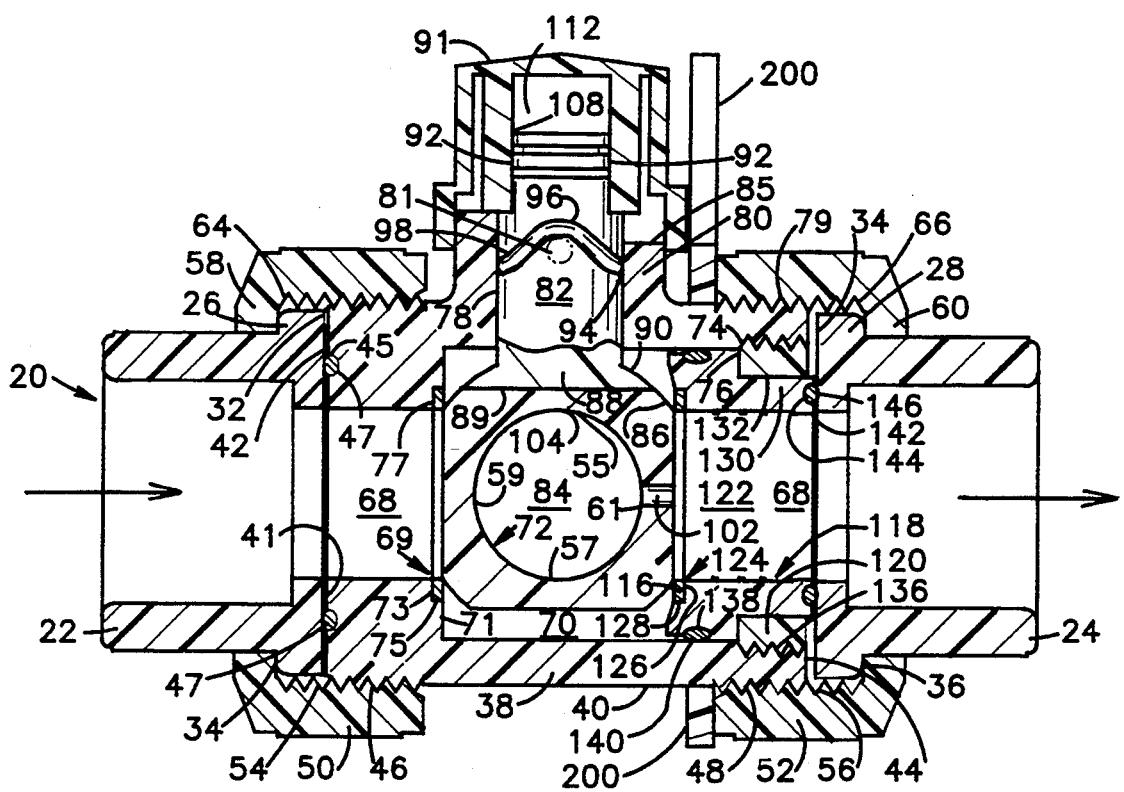
FIG. 5 is a longitudinal sectional view of the vented ball valve and lock-out ring assembly of FIG. 1 showing the ball in the fully closed flow position wherein the flow is from left to right and showing a cut-away view of the stem assembly.

As best shown in FIGS. 4 and 5, the vented valve includes a main tubular valve body portion 38 having a generally cylindrical external surface 40. The tubular valve body 38 extends from a wall 41 having a first generally radial end face 42 at one end of the body to an annular edge 43 having a second generally radial end face 44 at the opposite end of the body 38. An annular retaining groove 45 disposed within the radial outer end face 42 of the valve body wall 41 contains a resilient sealing and biasing member such as an end connector O-ring 47 which abuts the radial face 30 of the flange 26 of first end connector 22 to further assist in sealing of the assembly. Each end of the external surface 40 of the body 38 is provided with an externally threaded end portion 46, 48. Union nuts 50, 52 include a threaded cylindrical portions 54, 56 on their inner surfaces threadably engageable with the threaded end portions 46, 48 of the tubular valve body 38. Extending radially inwardly from one end of the cylindrical threaded portions 54, 56 of each union nut 50, 52 is a flange 58, 60 which presents a central opening adapted to slide longitudinally on the outer circumference of the corresponding end connectors 22 and 24, respectively. The union nut flanges 58, 60 include an internal frustoconical surface 64, 66 that tapers radially inwardly and away from the main tubular valve body 38 so that it corresponds to the adjacent frustoconical surfaces 34, 36 of the end connector flanges 26, 28. Accordingly, when the union nuts 50, 52 are tightened onto the main valve body portion 38, the radially extending union nut flanges 58, 60 imposes longitudinal forces on the end connectors 22 and 24.

The open-ended, main tubular valve body 38 is provided with a longitudinally extending flow passage 68 extending therethrough from the first generally radial end face 42 through the wall 41 to the second generally radial end face 44 of the annular edge 43. The flow passage 68 includes a plurality of axially extending, generally cylindrical sections of various diameters.

One such section forms an annular receiving recess 69 within an inner radial end face 71 of end wall 41 of the tubular valve body 38 as illustrated in FIGS. 4 and 5. The annular receiving recess 69 includes an axially facing end wall 73 and a radially facing guide wall 75 for receiving a first annular support seal member 77, preferably made of teflon for seating and sealing the valve ball 72 with the tubular valve body 38.

Another axial recess positioned generally centrally of the main valve tubular body 38 defines a valve member receiving chamber 70. As shown in FIGS. 3 and 4, the valve member receiving chamber 70 is essentially the same diameter as the flow passage 68, wherein at least one end of the main tubular valve body 38 is sufficiently enlarged for endwise insertion of a valve member, more particularly a valve ball 72, into the valve member receiving chamber 70; however, the valve member receiving chamber may be cylindrically shaped to house a substantially cylindrical plugged shaped valve member as well.

An axially, inwardly extending counterbore 74 is provided between the valve member receiving chamber 70 and the end 43 of the tubular valve body 38. The counterbore 74 defines an internal shoulder 76 spaced apart from the first end 42 of the main body 38 by a predetermined axial distance having a threaded inner surface 79 therealong. It is contemplated that another counterbore 74 structure could be used to replace the wall 41; however, only one end of the valve body 38 need by open to accommodate the valve ball member 72.

Figure 12:
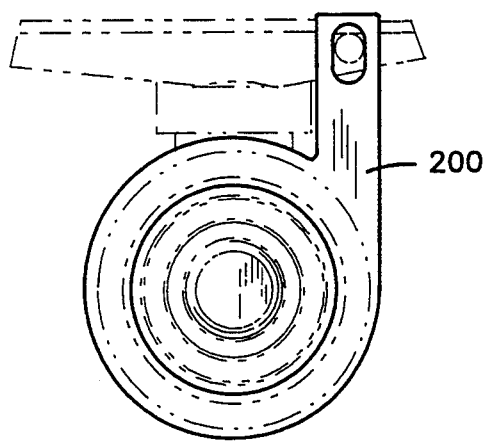
FIG. 12 is an end view of FIG. 11 showing the hole in the lock-out ring member aligned with a hole through the handle of the vented ball valve shown in phantom lines and the throughbore of the vented ball valve member in the fully open position.
Figure 11:
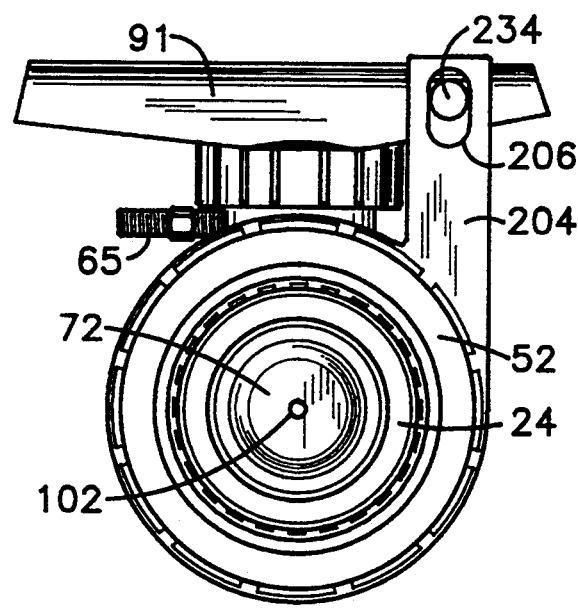
FIG. 11 is an end view of FIG. 1 showing the hole in the lock-out ring leg member aligned with a hole through the handle and the vented ball in the closed position, and showing a nipple extending from the valve valve body bonnet vent.

A bore or stem receiving passage 78 extending downward through the bonnet 80 defines an axis substantially perpendicular to the longitudinal axis of the longitudinal passage 68 through the tubular valve body 38 communicating with the valve member receiving chamber 70. The outwardly projecting collar or bonnet 80 formed integral with the main tubular body 38 provides additional lateral support for a substantially cylindrical valve stem 82 received within the bonnet stem receiving passage 78. A vent hole 81 is disposed through the valve body bonnet 80 between the top of the bonnet 80 and the tubular portion of the valve body 38 for venting vapor and liquid fluids trapped under pressure in a downstream section of the conduit when the valve is rotated to the close position. As shown in FIGS. 11 and 12, a nipple 65 may extend coaxially around the vent hole 81, or a deflector 67 may partially enclose the vent hole 81 to provide a means for directing the flow of the pressurized fluid from the vent hole 81. A conduit may be attached to the nipple 65 to direct fluids from the vent hole 81 to a suitable storage container for reuse or disposal. The upper end of the bonnet 80 terminates in stepped planes with the upper plane 83 extending through 270 degrees and the lower plane 85 extending through 90 degrees to form stops 93, 95 against which a handle 91 may abut when moving the valve into fully opened or fully closed positions by rotating the handle 91 one quarter turn.

Figure 6:
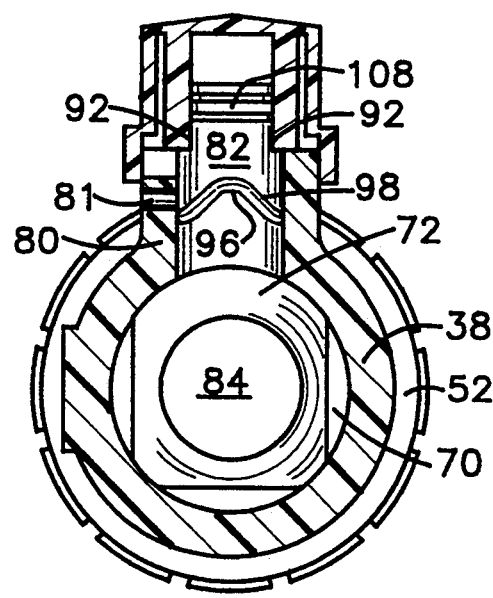
FIG. 6 is a transverse sectional downstream end view of the vented ball valve and lock-out ring assembly of FIG. 1 with the stem and ball valve member positioned in the open valve position showing a cut-away view of the stem assembly with the annular sealing member O-ring extending below the valve body bonnet vent hole sealing the vent, and showing the ball valve member in the fully open flow position wherein the flow is from left to right.

The valve ball member 72 of the preferred embodiment includes a throughbore 84 therethrough. More particularly, the valve member 72 of the preferred embodiment as shown best in FIGS. 3-5, is a generally spherical valve ball 72 defining a top wall 55 connected to a bottom wall 57 by a first flow blocking side wall 59 and a second flow blocking side wall 61, and a pair of end walls 63 including a central throughbore 84 therethrough defining a flow passage is detachably engageable with the valve stem 82. The valve ball 72 is rotatable about a rotational axis substantially perpendicular to the axis of the central bore 84. The generally spherical shape of the ball valve 72 provides a sealing surface in cooperation with the valve body 38. The external surface 86 of the valve ball 72 has a nominal diameter which is less than the nominal diameter of the valve member receiving chamber 70 so that the tubular valve body 38 does not interfere with the rotation of the valve ball 72 about its axis between its "valve open" flow permitting position of FIGS. 4 and 6, and the "valve close" flow blocking position of FIGS. 5 and 7. As shown in FIGS. 4 and 5, the stream of flow through the valve is from left to right; therefore, when the ball valve member 72 is in the closed position as shown in FIG. 4, rotating the handle 91 one-quarter turn counterclockwise rotates ball valve member 72 aligning the throughbore 84 with the axis of the tubular valve body 38 and conduits.

A generally centrally located ball valve member vent hole 102 is disposed through the downstream valve ball side wall, shown as second ball wall 61 and through the external ball surface 86 directed toward the downstream end 44 of the tubular body having the annular edge 43 during the valve closed position. The portion of the central bore 84 intersecting the external surface 86 of the ball 72 forms open end side walls defining central flattened peripheral edges 104, 106 which permit vapor or liquid fluid entering the central bore 84 from the ball vent hole 102 to flow from the interior of the ball 72 around the peripheral edges 104, 106 upward between the valve stem 82 and the valve bonnet stem receiving passage 78.

Figure 7:
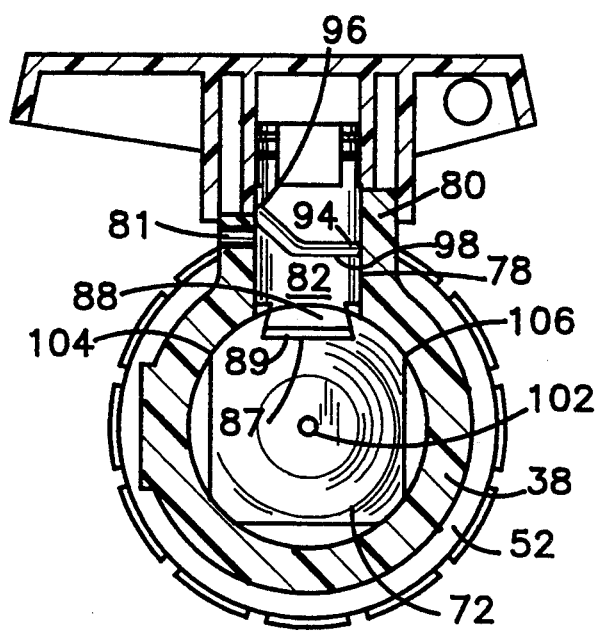
FIG. 7 is a transverse sectional downstream end view of the vented ball valve and lock-out ring assembly of FIG. 1 with the stem and ball positioned in the closed valve position showing a cut-away view of the stem assembly with the arched portion of the axial groove having an O-ring therein extending above the valve body bonnet vent hole and showing the ball in the fully open flow position wherein the flow is from left to right.

A recess or groove 87 which is generally perpendicular to both the ball rotational axis and to the bore 84, is provided in the valve ball 72 at a location where it does not interfere with the sealing portion of the external ball surface 86. The groove 87 has a dovetail cross-sectional configuration extending completely across the ball 72 adapted to receive a correspondingly configured stem end portion. A complementary stem end portion terminates at its lower end in a key 88 having a flat lower surface 89 and an arcuate upper surface 90 corresponding generally to the upper surface of the ball at the point of their engagement as shown in FIGS. 3 and 7.

The generally cylindrical valve stem 82 is provided with a generally centrally located, generally horizontal axial groove 94 of decreased diameter therein having an offset forming an upwardly extending arch 96 around a portion of its circumference. The groove 94 and offset arch include an annular sealing member 98 disposed therein such as a conventional O-ring sealably engageable with the stem receiving passage 78 of the bonnet 80 forming a vapor and liquid tight seal between the stem 82 and the stem receiving passage 78 as shown along a longitudinal axis in FIGS. 4 and 5, and shown in an end view in FIGS. 6 and 7. In this manner a fluid seal is selectively effected between the stem receiving passage 78 and the valve stem 82 above or below the bonnet vent hole 81. The upper end of the stem 82 includes parallel sidewalls 92 and may have at least one ridge 108 extending horizontally outward from the cylindrical portion of the stem located between the parallel sidewalls 92 to provide a friction fit with a handle 91.

FIG. 4 shows the handle 91 to include a downwardly extending integral web 110 having a recess 112 (not shown) therein for receiving the upper end of the valve stem 82. A shoulder 114 is formed integrally with the web 110 to engage with the stops 93, 95 of the bonnet 80 when the assembled handle 91, valve stem 82, and valve ball 72 are rotated the proper distance. In the preferred embodiment the handle 91 is simply press fitted onto the stem 82 so that the ridges 108 of the stem 82 provide a tight friction fit with the web 110 of the handle 91. A detachable fastening clip (not shown) may be attached to the web 110 of the handle 91 to provide a shim adapted to cooperate with the parallel sidewalls 92 to enhance the gripping action of the between the web 110 of the handle 91 and the upper portion of the stem 82.

As best shown in FIGS. 3, 4, and 5, the valve ball 72 detachably engageable with the valve stem 82 and is normally confined between the first annular support seal member 77 and a similar second annular support seal member 116 mounted within a tubular bifurcated seal carrier 118. The seal carrier 118 is slidably received in the ball entry annular edge end 43 of the main tubular valve body 38 and held adjustably into position by an adjustable retainer ring member 120 threadedly engaged with the threaded inner surface 79 of the tubular body 38.

The seal carrier 118 includes a longitudinal bore 122 having a diameter substantially equivalent to the diameter of the valve ball 72 throughbore so that the fluid passing through the tubular valve body portion 38 is substantially unrestricted by the presence of the seal carrier 118 and valve ball 72. The leading end of the seal is provided with an annular receiving recess 124 which includes an axially facing end wall 126 and a radially facing guide wall 128 for receiving the second annular support seal member 116, preferably made of teflon for seating and sealing the valve ball 72 within the tubular valve body 38. The seal member 116 is dimensioned for limited radial centering movement in the receiving recess 124.

The leading end of the seal carrier 118 has a larger external diameter and the trailing portion 130 has a smaller external diameter to define a shoulder 132. The external diameter of the trailing portion 130 of the seal carrier 118 is less than the interior diameter of the bore 134 of the retainer ring 120 permitting a coaxial fit of the retainer ring 120 around the trailing portion 130 so that the retainer ring slidably abuts the shoulder 132 of the seal carrier 120. The exterior diameter 136 of the retainer ring 120 is threaded and sized according to the diameter of the threaded inner surface 79 of the tubular valve body 38 for threadedly engagement therein. The retainer ring 118 provides for axial movement of the seal carrier 118 against the valve ball 72 for adjustment within the tubular body 38.

The seal carrier 118 is provided with a circumferential groove 138 that receives a peripheral seal member 140 such as an O-ring to prevent fluid from leaking between the seal carrier 118 and the throughbore of the tubular valve body 38.

The end of the seal carrier trailing portion 130 defines an end wall 142 having an annular retaining groove 144 disposed therein. An annular, resilient sealing and biasing member, such as a "VITON" O-ring 146 is received in the groove 144 to provide a fluid seal between the axial facing walls of the seal carrier 118 and the flange 28 of second end connector 24. In addition, the O-ring 146 provides an axial force biasing the seal carrier 118 toward the valve ball 72.

Assembly of the vented ball valve 20 in this manner, wherein the valve stem 82 is contained within the bonnet stem receiving passage 78 and is provided with an O-ring 98 mounted within a axial offset groove 94 within the stem body 82 provides a novel venting means. The valve 20 of the preferred embodiment uses a typical thermoplastic ball 72 having a central flow passage 84 and a vent hole 102 in the side wall oriented toward the downstream position when closed. Rotation of the stem 82 and ball 72 engaged thereby, to the valve closed position, permits venting of the downstream line through the vent hole 81 of the bonnet 80 to the atmosphere, a container, or to bleed into in-transit inventory such as the pipeline.

Accordingly, the plastic vented ball valve 20 designed in this manner does not require that the valve ball 72 be seated extremely tight against the seats formed by the first annular support member 77 and the second annular support member 116 so as to deform the valve ball 72 or cause premature wear. Instead of attempting to trap the fluid, gas vapor, or air between the valve ball 72 and seat seals (77 and 116) within the tubular valve body 38, when the valve 20 is in the closed position, the fluid from the downstream portion of the conduit is permitted to flow through the downstream valve ball vent hole 102 and seep around the peripheral edges 104, 106 of the valve ball 72 and tubular valve body 38. The flow of the fluid which seeps around the valve ball 72 is controlled by the novel design and function of the vented ball valve stem 82 formed having a axial groove 94 and at least one upwardly extending arch 96 on at least one side containing an annular seal member 98 for providing a seal either below or above the bonnet vent hole 81 depending upon the rotation of the stem 82 by the handle 91. A tight seal is provided between the annular seat seals (77 and 116), and the tubular valve body 38 by the incorporation of additional O-rings 47, 140, and 146 in the body and O-ring 98 within the stem 82.

More particularly, in the valve open full flow position, the valve ball 72 seals the downstream side of the ball vent hole 102 against the side wall of the valve body between the annular seat seals (77 and 116) and aligns the valve ball throughbore 84 into flow-through alignment with the flow passage 69 and the first and second flow-through ends of the tubular valve body 38. Furthermore, in the open position, the annular sealing member 98 or O-ring within the offset arched portion 96 of the axial groove 94 is positioned below or over the vent hole 81 in the valve bonnet 80 providing a seal between the stem 82 and the bonnet stem receiving passage 78 within the bonnet 80 preventing vapor or liquid fluid from leaking through the valve body bonnet vent hole 81.

Rotation of the handle 91 to the valve closed position, rotates the stem 82 and valve ball 72 out of flow-through alignment so that the ball vent 102 is oriented in the downstream direction opposite end wall 41. The annular seat seals (77 and 116) on which the valve ball 72 is seated provides a seal between the tubular valve body 38 and exterior surface 86 of the valve ball 38, whereby the ball vent is in flow communication with the first or second flow-through ends providing flow communication with the vapors contained in the downstream conduit or pipeline. Rotation of the stem 82, positions the offset arched portion containing O-ring 98 above the valve body vent hole 81 in the valve bonnet 80. The residual downstream vapor and/or liquid fluid in the pipeline passes through the downstream ball vent hole 102 into the throughbore 84, seeps around the peripheral edges (104, 106) of the valve ball 72 and valve receiving chamber 70 of the tubular valve body 38, between the valve body bonnet stem receiving passage 78 and the stem 82, and out of the bonnet vent hole 81 positioned below the offset arched portion 96 of the stem O-ring 98. The flow of the fluid and venting of pressurized vapor from the downstream portion of the pipeline through the valve ball member vent hole 102 to the atmosphere through the valve body bonnet vent hole 81 provides for safe disassembly of the valve and or sections of the pipeline.

An alternate embodiment of the present invention as shown in FIGS. 19–22, may be provided with a generally axial groove 94 having at least one offset defining an arch 96 around a portion of its circumference and having a generally horizontal portion having an annular sealing member 98 such as an O-ring being disposed therein being positioned above the valve body bonnet vent hole 81. The arched portion 96 and the annular sealing member 98 therein extends below the valve body bonnet vent hole 81, so that rotating the stem 82 and valve member 84 into flow-through alignment positions the arched portion 96 and annular sealing member 98 therein below or over the valve body bonnet vent hole 81 sealing the valve body bonnet vent hole 81. Rotation of the stem 82 and the valve member 84 out of flow-through alignment rotates the axial groove 94 and annular sealing member 98 therein above the valve body bonnet vent hole 81 providing venting flow communication from the atmosphere through the valve body bonnet vent hole 81, between the stem 82 and the stem receiving passage 78, the valve receiving chamber 70 of the tubular valve body 38, the valve member vent hole 102, and the first or second flow-through ends of the tubular valve body 38.

Another embodiment of the vented valve 10 may combine the features of the preferred embodiment shown in FIGS. (1, 4, 5, 6, and 7) having an upward offset 96 with the features of the alternate embodiment shown in FIGS. (19–22) having a downward offset 96 to incorporate a plurality of valve body vent holes 81 at positions below, above, or spaced apart from one another around the circumference of the valve body bonnet 80. A complementary axial groove 94 having one of more offset portions 96 extending upward, downward, or even upward and downward around the circumference of the stem 82 including one or more annular sealing members 98 therein can be used in combination with the venting holes 81 at various positions for use in multi-stream valves such as 3-way valves commonly used in the chemical processing industry.

Figures 8, 9:
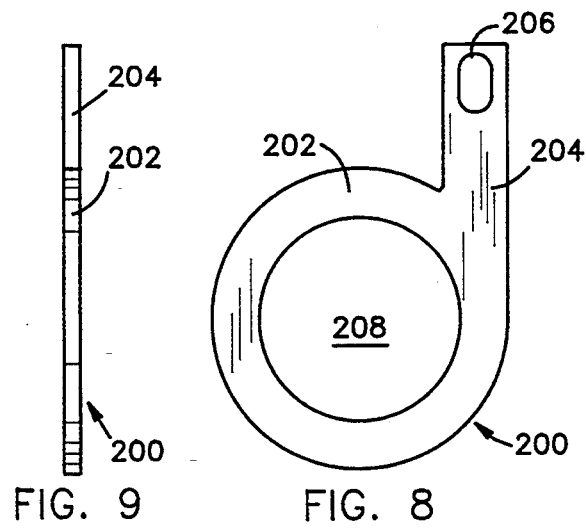
FIG. 8 is a front plan view of the lock-out ring of FIG. 1 of the present invention.
FIG. 9 is a side view of the lock-out ring of FIG. 8.

A means for locking the handle 91 of the vented ball valve 20 in the closed position is provided by a removable, generally "d" shaped lock-out ring device 200 as shown in FIG. 8. The lock-out ring 200 of the preferred embodiment is molded from a plastic such as "ABS"; however, the ring may be formed from metal as well. The lock-out ring 200 is formed having a generally circular main body ring 202 and a generally straight leg member 204 extending outwardly from one side of the ring 202. The distal end of the leg member 204 is formed having at least one hole 206 in the distal end. The lock-out ring 200 has a generally central bore 208 therein, sized to fit coaxially around the tubular portion of the valve body 38 or a cylindrical pipe so as to be rotatably and coaxially mounted thereon.

Figure 10:
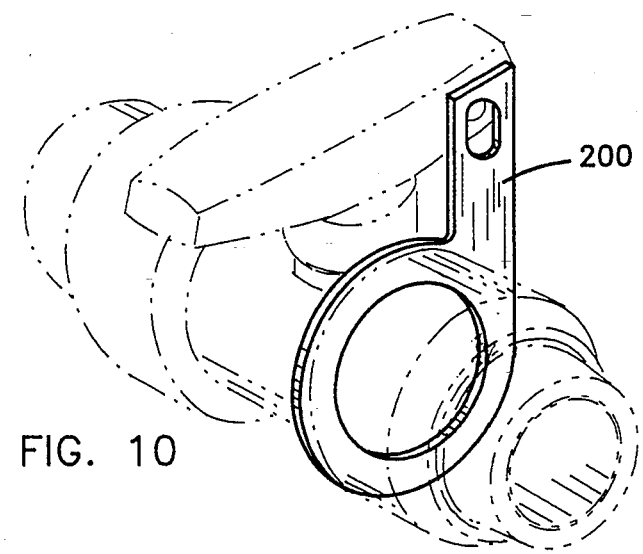
FIG. 10 is a perspective view of the lock-out ring of FIG. 9, with the hole in the leg member positioned in alignment with a hole in the handle of the closed valve to be locked out showing the valve in perspective view in phantom lines.
Figure 14:
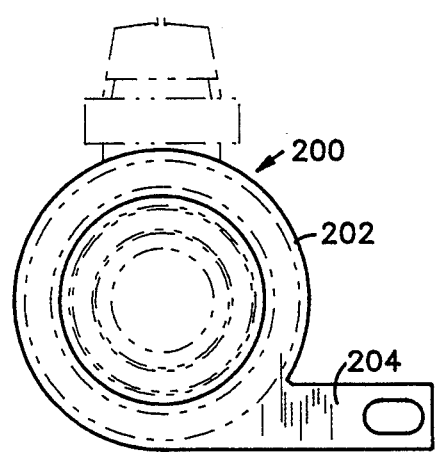
FIG. 14 is an end view of FIG. 11 showing the hole in the lock-out ring member rotated away from the handle of the vented ball valve shown in phantom lines.
Figure 13:
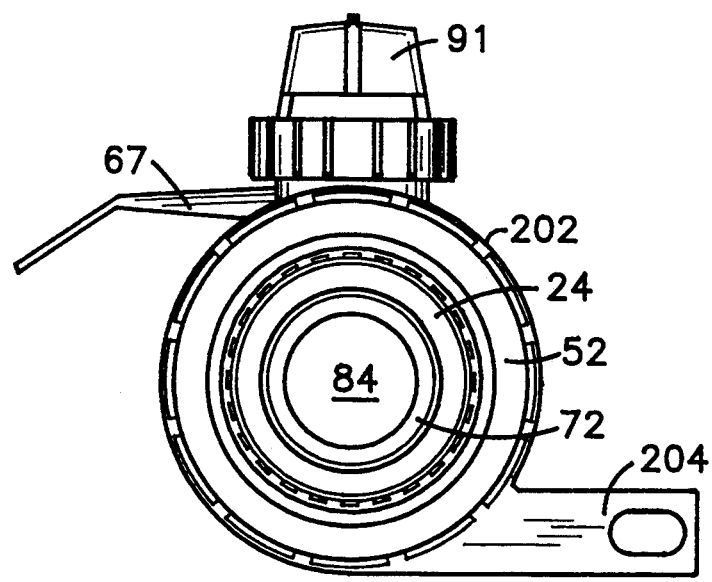
FIG. 13 is an end view of FIG. 1 showing the lock-out ring leg member rotated away from the handle of the vented ball valve member in the open position, and showing a deflector member extending around the valve bonnet vent hole.
Figure 17:
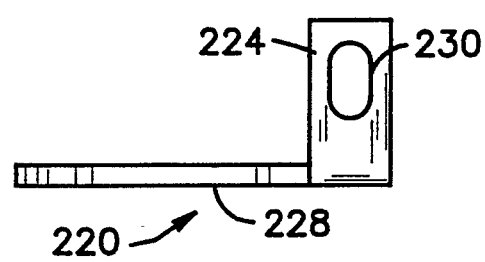
FIG. 17 is a top view of the lock-out ring of FIG. 15.
Figure 16:
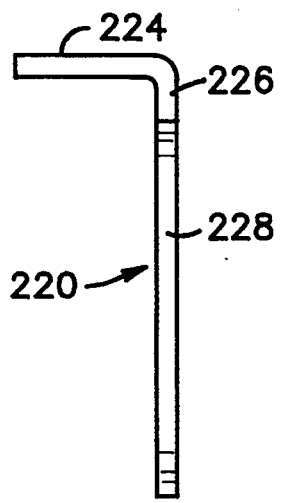
FIG. 16 is a side view of the lock-out ring of FIG. 15 showing the narrow width of the lock-out ring.
Figure 15:
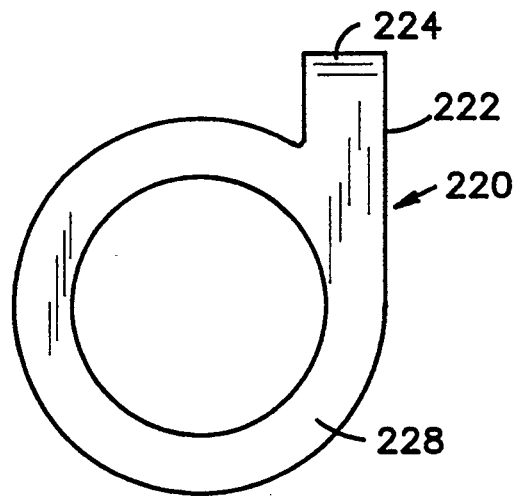
FIG. 15 is a front plan view of another embodiment of the lock-out ring of FIG. 1 having a leg member wherein the distal end thereof is bent at an angle to provide alignment with a handle hole in the extending normal to the axis of the tubular main valve body.
Figure 18:
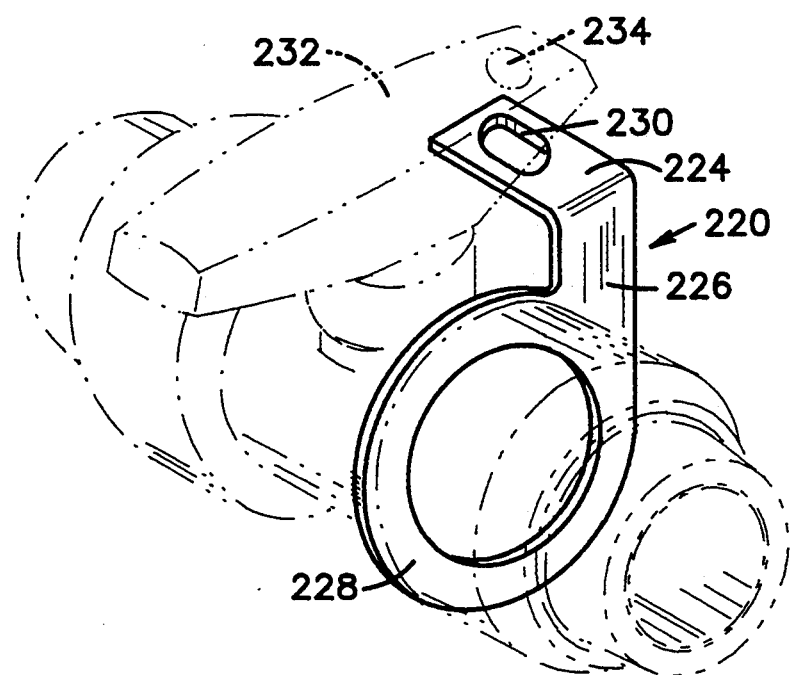
FIG. 18 is a perspective view of the lock-out ring of FIG. 15, with the hole in the leg member positioned in alignment with a hole in the handle of the closed valve to be locked out showing the valve in perspective view in phantom lines.
Figure 19:
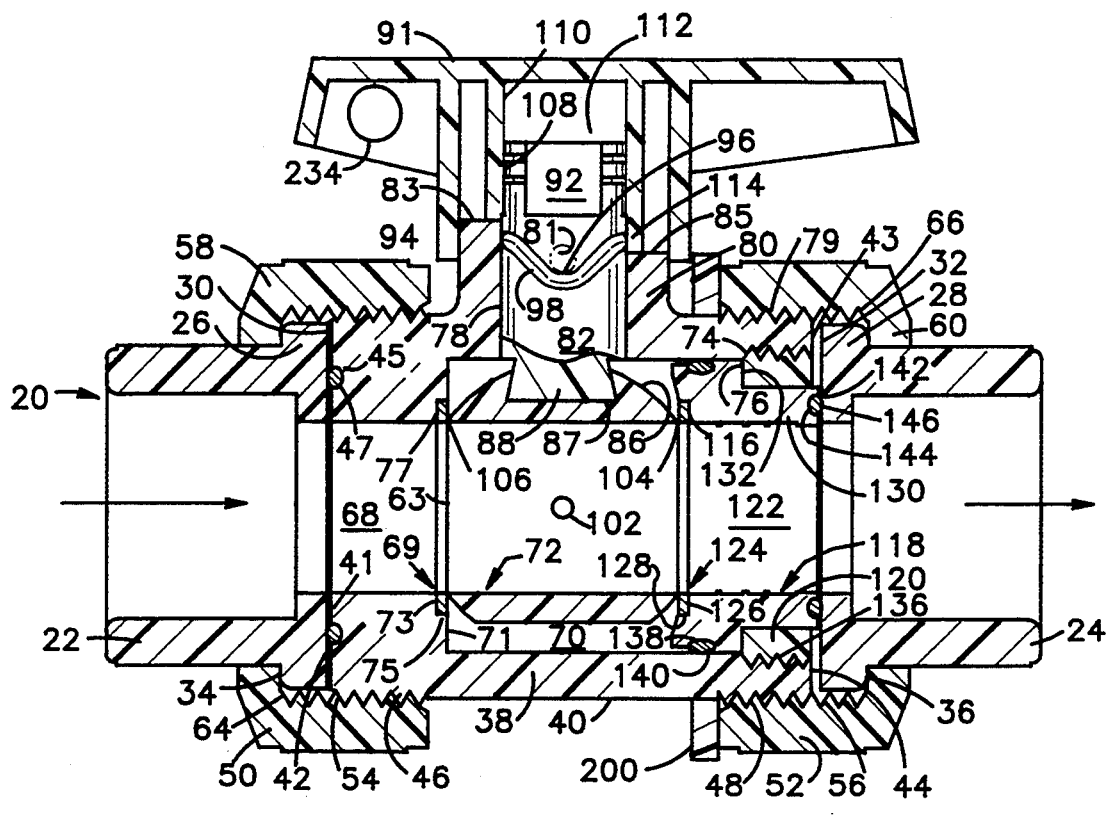
FIG. 19 is a longitudinal sectional view of the vented ball valve and lock-out ring assembly and a cut-away view of the stem assembly showing a vent in the valve body bonnet and a stem having an axial groove having a downward offset portion including an annular sealing member therein, wherein the stem and valve ball member is aligned in the flow-through position wherein the flow is from left to right.
Figure 20:
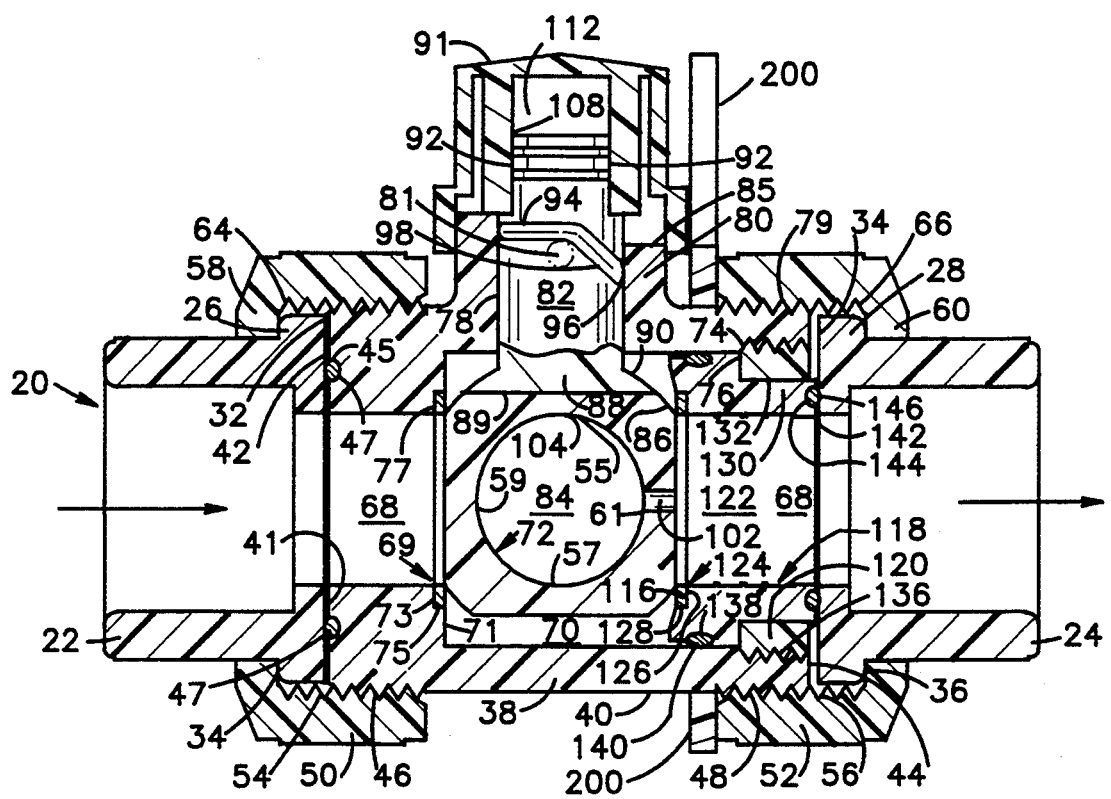
FIG. 20 is a longitudinal sectional view of the vented ball valve and lock-out ring assembly and a cut-away view of the stem assembly showing a vent in the valve body bonnet and a stem having an axial groove having a downward offset portion including an annular sealing member therein, wherein the stem and valve ball member is aligned out of the flow-through position wherein the flow is from left to right.
Figure 21:
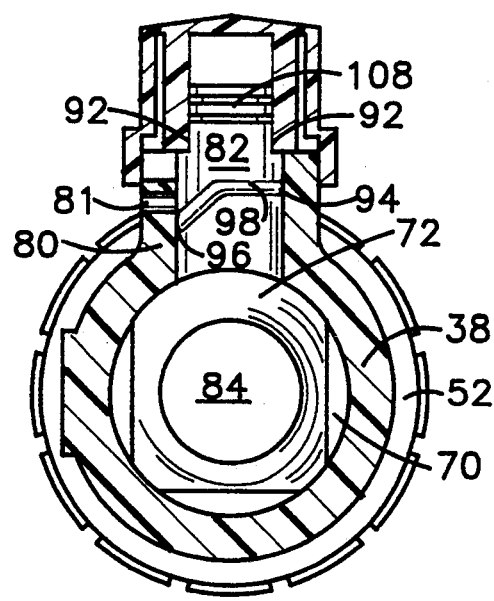
FIG. 21 is a transverse sectional downstream end view of the vented ball valve and lock-out ring assembly and a cut-away view of the stem assembly with the stem and ball valve member positioned in the open valve position showing the stem having an axial groove with a downward offset portion containing an annular sealing member O-ring extending below the valve body bonnet vent hole sealing the vent, and showing the ball valve member in the fully open flow position wherein the flow is from left to right.
Figure 22:
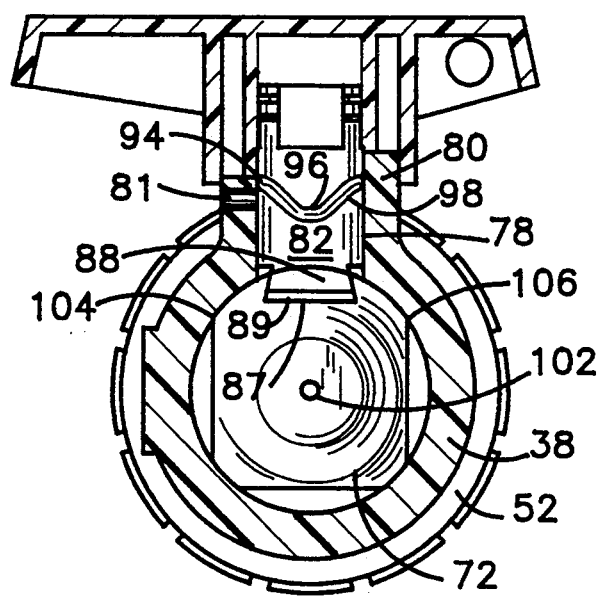
FIG. 22 is a transverse sectional downstream end view of the vented ball valve and lock-out ring assembly and a cut-away view of the stem assembly with the stem and ball positioned in the closed valve position showing an axial groove having a downward offset portion including an annular sealing member O-ring therein extending above the valve body bonnet vent hole and showing the ball in the fully open flow position wherein the flow is from left to right.

As shown in FIG. 9, the lock-out ring 200 is formed having a thin profile adapted to fit coaxially around the tubular valve body 38 between the valve stem 82 and union nut 50, 52 as best shown in FIGS. 1, 2, and 10. FIGS. 13 and 14 show the lock-out ring 200 in the "not-in-use" position with the leg member 204 rotated out of the rotation pathway of the valve handle 91 when the valve ball 72 is positioned in the fully open position. Rotation of the lock-out ring 200 around the valve body 38 aligns the hole 206 in the leg member 204 with a hole 234 formed in one end of the valve stem handle 91 when the valve is in the closed position as shown in FIGS. 11 and 12. A securing device such as a bolt or a shackle of a padlock can be inserted through the hole 206 in the locking ring leg member 204 and the hole 234 in the valve handle 91 to prevent rotation of the handle 91 and valve ball 72 to the open position.

Accordingly, use of a lock-out ring 200 with an existing valve 20 may be accomplished by the following procedure after interrupting flow through the piping attached thereto. The union nut 50, 52 is simply rotated to disengage them from the valve body and to dispose the nuts over the piping connected to the end connectors 22, 24. The lock-out ring 200 is merely slipped between the tubular valve body 38 and the end connector 22, 24. The end connector 22, 24 is realigned with the main tubular valve body 38 and the union nut 50, 52 are retightened thereon.

FIGS. 15, 16, 17, and 18 show another embodiment of the lock-out ring 220 having a leg member 222 provide with a distal end 224 bent in a plane approximately 90 degrees with respect to the proximal end portion 226 of the leg member 222 and the circular ring body member 228. A hole 230 within the distal end 224 of the generally flat leg member 222 is adapted to align with valve handle 232 having a hole 234 extending therethrough normal to the axis of the tubular valve body 38.

The lock-out rings 200 and 220 may be used with valves other than the double union vented ball valve 20 described in the preferred embodiment. Due to the inexpensive construction of the lock-out ring 200, the lock-out ring 200 may be incorporated in metal or plastic valve assemblies before use in a pipe line or added to existing valves currently in use to provide a safety lock-out device readily available for use.

In the preferred embodiment, the lock-out ring is formed from polyvinyl chloride ("PVC"), and the vented ball valve is fabricated from corrosion-resistant material such as Acrylonitrile butadiene styrene ("ABS"); however, the annular seals seating the valve ball are formed from a teflon. It is contemplated that any or all of the valve components display could be constructed of plastic materials such as high density polyethylene or graphite fiber compositions. The vent design of the present invention could also be incorporated in a valve and lock-out ring utilizing metal components as well.

The foregoing detailed description is given primarily for clearness of understanding and no unnecessary limitations are to be understood therefrom; for modifications will become obvious to those skilled in the art based upon more recent disclosures and may be made without departing from the spirit of the invention and scope of the appended claims.

I claim:

1. A valve lock comprising:
   a one-piece member having a generally circular main body formed having a central bore therethrough fitting coaxially and rotatably around a tubular body portion adjacent an in-line valve having a rotatable handle, said valve lock having an offset leg member extending outwardly from at least one side of said main body having at least one hole therein for alignment with said rotatable handle having a hole therein near one end, whereby inserting a retaining member through said handle hole and said leg member hole prohibits movement of said handle.

2. The valve lock of claim 1, wherein said circular main body forms a generally flat ring having a thin profile adapted to fit coaxially around a tubular valve body.

3. The valve lock of claim 1, wherein said leg member is generally straight.

4. The lock-out device of claim 1, wherein said main body and said leg member are of one-piece planar construction, said leg offset leg member having a distal end portion formed at an acute angle for aligning said leg member having a hole therein in position with a rotating handle having hole therein near one end normal to the axis of said main body.

5. The valve lock of claim 1, wherein said lock-out device is comprised of a thermoplastic material.

6. The valve lock of claim 1, wherein said lock-out device is comprised of metal.

* * * * *